United States Patent
Le Guillou et al.

(10) Patent No.: US 10,310,993 B2
(45) Date of Patent: Jun. 4, 2019

(54) EMULATION OF PHYSICAL EQUIPMENT

(71) Applicant: Orange, Paris (FR)

(72) Inventors: Xavier Le Guillou, Chateaugiron (FR); Dimitri Bricheteau, Rennes (FR); Guillaume Roul, Noyal sur Vilaine (FR)

(73) Assignee: ORANGE, Paris (FR)

( * ) Notice: Subject to any disclaimer, the term of this patent is extended or adjusted under 35 U.S.C. 154(b) by 229 days.

(21) Appl. No.: 15/106,668

(22) PCT Filed: Dec. 19, 2014

(86) PCT No.: PCT/FR2014/053454
§ 371 (c)(1),
(2) Date: Jun. 20, 2016

(87) PCT Pub. No.: WO2015/092319
PCT Pub. Date: Jun. 25, 2015

(65) Prior Publication Data
US 2016/0342538 A1    Nov. 24, 2016

(30) Foreign Application Priority Data
Dec. 20, 2013  (FR) ..................................... 13 63332

(51) Int. Cl.
*G05B 17/00* (2006.01)
*G06F 13/10* (2006.01)
*G06F 9/4401* (2018.01)

(52) U.S. Cl.
CPC .......... *G06F 13/107* (2013.01); *G06F 9/4411* (2013.01)

(58) Field of Classification Search
CPC ........................... G06F 13/107; G06F 9/4411
See application file for complete search history.

(56) References Cited

U.S. PATENT DOCUMENTS

| | | | | |
|---|---|---|---|---|
| 8,028,040 | B1 * | 9/2011 | Hobbs | G06F 9/45558 370/389 |
| 2007/0254588 | A1 * | 11/2007 | Lafuente | H04M 1/7253 455/41.2 |

(Continued)

FOREIGN PATENT DOCUMENTS

WO    WO-2013023195 A1 *   2/2013    ............. G06F 3/023

OTHER PUBLICATIONS

English translation of the Written Opinion of the International Searching Authority dated Apr. 7, 2015 for corresponding International Application No. PCT/FR2014/053454, filed Dec. 19, 2014.

(Continued)

*Primary Examiner* — Timothy A Mudrick
*Assistant Examiner* — Abdou K Seye
(74) *Attorney, Agent, or Firm* — David D. Brush; Westman, Champlin & Koehler, P.A.

(57) ABSTRACT

A method is provided for emulating a physical interface of a device capable of communicating in a network. The physical interface is capable of receiving at least one piece of peripheral equipment. The method includes: pre-association in order to establish a set of possible associations between the physical interface and at least one software interface of at least one terminal; selecting an association between the physical interface and at least one software interface of at least one terminal, from all the possible associations; routing the messages between the physical interface and the associated software interface.

12 Claims, 5 Drawing Sheets

(56) References Cited

U.S. PATENT DOCUMENTS

2008/0320501 A1 12/2008 Li et al.
2012/0200776 A1* 8/2012 Tanaka ............... H04N 21/4316
              348/564

OTHER PUBLICATIONS

International Search Report dated Apr. 7, 2015 for corresponding International Application No. PCT/FR2014/053454, filed Dec. 19, 2014.
Wonhong Kwon et al., "Design and Implementation of Peripheral Sharing Mechanism on Pervasive Computing with Heterogeneous Environment", May 7, 2007 (May 7, 2007), Software Technologies for Embedded and Ubiquitous Systems; Lecture Notes in Computer Science, Springer Berlin Heidelberg, Berlin, Heidelberg, pp. 537-546, XP019073228.
Written Opinion of the International Searching Authority dated Apr. 7, 2015 for corresponding International Application No. PCT/FR2014/053454, filed Dec. 19, 2014.

* cited by examiner

EMULATION OF PHYSICAL EQUIPMENT

CROSS-REFERENCE TO RELATED APPLICATIONS

This Application is a Section 371 National Stage Application of International Application No. PCT/FR2014/053454, filed Dec. 19, 2014, the content of which is incorporated herein by reference in its entirety, and published as WO 2015/092319 on Jun. 25, 2015, not in English.

TECHNICAL FIELD

The invention is applicable to any terminal equipped with a communications interface for an external peripheral device (peripheral device for storage, printing, display, etc.).

The invention is most particularly applicable to terminals whose communications interfaces are difficult to access by a user.

PRIOR ART

Generally speaking, a terminal equipped with a communications interface is used by directly connecting, wired or wireless, the peripheral equipment (for example a peripheral device for storage, printing, display, recording, etc.) to the physical interface of the terminal, for example by means of a wired connection of the USB (Universal Serial Bus) type or of a wireless connection of the WIFI type, etc.

However, some terminals are sometimes too far away from the user (they are located in another room of the house, in a cupboard, in a loft, etc.)

Moreover, some terminals, although potentially close to the user, have interfaces that are difficult to access (since they are situated physically at the rear of the terminal, underneath, on top, etc.)

In order to overcome this problem, the protocols well known to those skilled in the art by the term "USB over IP" allow the USB signals to be encapsulated within TCP/IP frames and enable them to be transmitted to another piece of equipment within an Internet (IP) network.

However, the use of such a protocol only allows interfaces of the USB type to be transferred, and assumes a manual association between the terminal and the physical interface.

Today, there exists no simple solution for automatically accessing, remotely, the interfaces of such terminals.

SUMMARY

For this purpose, according to one functional aspect, one subject of the invention is a method for emulating a physical interface of a device capable of communicating within a network, said interface being designed to receive at least one unit of peripheral equipment, the method being characterized in that it comprises the following steps:
  pre-association for establishing a set of possible associations between said physical interface and at least one software interface of at least one terminal;
  selection of an association between said physical interface and at least one software interface of at least one terminal, from amongst all the possible associations;
  routing of the messages between the physical interface and the associated software interface.

Thus, the emulation method offers the advantage of providing a bidirectional communication by exchanging messages between the peripheral equipment and the terminal, even when the peripheral equipment is not directly connected to the terminal but to another piece of equipment on the network. Everything happens, in this case, as if the physical interface of the emulation device were located on the terminal. The term "physical interface" is understood here to mean the hardware part of the interface (for example a connector) and all of the software modules that allow it to be managed (also referred to as "drivers"). In this way, each of the physical interfaces of the emulation device may be associated with one or more terminals of the network. For example, the emulation device, which is located near to the user, can comprise a USB interface and a SD interface to which a USB stick and a digital camera card are respectively connected. The USB stick may be associated with the personal computer (PC) of the user located in his/her bedroom. The card (SD) of the camera may be associated with the television set, which does not have a physical interface of this type, and with the tablet of the user. The user can thus, without moving, display his/her photographs on his/her television set and on his/her tablet, and transfer files from his/her PC as if the USB stick were directly connected to it.

In this way, remote access in read and write mode to the peripheral device is possible: the method according to the invention manages the communication in a transparent manner for the user and the terminal by directing (or "routing" in IT terminology) the data in an appropriate manner.

The pre-association allows a piece of equipment to be temporarily associated with one or more terminals. Indeed, it may be desirable for a peripheral device, for example a storage device, to be associated firstly with one terminal, then with another, or even shared between several terminals. Such a step for initial interconnection followed by an effective selection of the terminal equipment, for example via an interface offered to the user of the terminal, allows such an association over time. The pre-association step allows the establishment of a list of the possible associations between the terminals, their potential virtual interfaces and the physical interfaces available on the emulation device. Indeed, certain associations not having a physical sense (for example, associating a joystick with a near-field communications (NFC) interface constitutes an unrealistic combination), the idea is, as soon as the various terminals of the network are known, to provide the correct associations. Thus, when the user connects one of his/her peripheral devices (for example the joystick), he/she will obtain the list of terminals which may potentially be associated with it, in the present case the living room digital decoder whose services are perfectly appropriate to the use of a joystick.

Subsequently, an effective selection step allows one of the pre-associations to be chosen. Everything then happens as if the peripheral device were directly connected to the associated terminal (or to the terminals); for example, the USB stick may be associated with the PC of the user, then with his/her tablet, then simultaneously with the PC and with the tablet.

According to one particular embodiment of the invention, the association step is preceded by a step for declaring at least one terminal of the network to the device.

This embodiment allows each of the terminals to declare its capacities to the emulation device, for example when the terminal connects to the local network. The terminal may notably, during this initial step, declare its physical interfaces (type, number, capacities, etc.), the services that it offers (e.g. video games with joystick) together with its potential desire to benefit from other interfaces which it does not have available in a innate manner: for example a television set which does not have an interface of the SD type may nevertheless have a need for such a virtual interface.

According to a second particular embodiment of the invention, which could be implemented alternately or cumulatively with the preceding one, the association step is followed by a step for managing the priorities.

The definition of such priorities allows, according to this embodiment, a quality of service to be offered to the user, by arbitrating the potential conflicts between the various terminals. For example, the priority that can be assigned to some of them can allow conflicts to be resolved in the case where a USB interface is shared between two peripheral devices, the access being given to the one that has the highest priority. Such a mechanism can also advantageously allow the sharing of the bandwidth between several terminals and several physical ports of the device.

According to a third particular embodiment of the invention, which could be implemented alternately or cumulatively with the preceding ones, the selection step automatically selects an association if this association is the only one possible following the pre-association step.

According to this embodiment, it is therefore possible not to constrain the user to explicitly select an association, notably in the case where a unit of terminal equipment is the only one of a given type: for example, if there is only one PC connected to the network, it would be legitimate to automatically associate the USB stick with it. This possibility is also useful for allowing the user to define a default behavior for a given peripheral device (for example, the automatic association of a joystick with the living room digital decoder, which is the equipment most capable of supporting such an association).

According to another functional aspect, one subject of the invention is a method for managing a software interface on a terminal capable of communicating within a network, said method being characterized in that it comprises the following steps:
- a step for updating an association between a software interface and an external physical interface;
- a step for enabling the software interface;
- a step for communicating a message between the terminal and the associated external physical interface, via the software interface.

This aspect of the invention allows a terminal to manage a virtual software interface which connects it to a physical interface in the network. Subsequently, when the software interface is enabled, in other words it has been effectively associated with a physical interface, everything happens as if the terminal were effectively in local dialogue with this physical interface, the software interface taking the role of this physical interface in a transparent manner for the terminal.

According to one hardware aspect, the invention also relates to an emulation device comprising a communications module capable of communicating within a network, characterized in that it comprises the following modules:
- a module for accessing at least one physical interface designed to receive at least one unit of peripheral equipment;
- a pre-association module for establishing a set of possible associations between said physical interface and at least one software interface of at least one terminal;
- a module for selecting an association between said physical interface and at least one software interface of at least one terminal, from amongst all the possible associations;
- a module for managing the interfaces designed to provide the routing of the messages between the physical interface and the associated software interface.

The term 'module' may just as easily correspond to a software component as to a hardware component or an assembly of hardware and software components, a software component itself corresponding to one or more computer programs or sub-programs or, more generally, to any element of a program designed to implement a function or a set of functions such as described for the modules in question. In the same way, a hardware component corresponds to any element of a hardware assembly designed to implement a function or a set of functions for the module in question (integrated circuit, smart card, memory card, etc.)

According to another hardware aspect, one subject of the invention is an emulation device such as claimed, characterized in that the physical interface is located on the device.

According to another hardware aspect, one subject of the invention is an emulation device such as claimed, characterized in that the physical interface is external to the device.

According to another hardware aspect, the invention also relates to a terminal comprising a communications module capable of communicating within a network, characterized in that it comprises the following modules:
- a software interface;
- a module for updating an association between a software interface and an external physical interface;
- a module for enabling the software interface;
- a module for managing at least one software interface designed to exchange messages with an external physical interface.

According to another hardware aspect, the invention also relates to a service gateway comprising an emulation device such as claimed hereinabove.

According to another hardware aspect, the invention also relates to a communications system including an emulation device comprising a communications module capable of communicating with at least one terminal across a network, characterized in that:
- the emulation device furthermore comprises:
  - a module for accessing at least one physical interface designed to receive at least one unit of peripheral equipment;
  - a pre-association module for establishing a set of possible associations between said physical interface and at least one software interface of at least one terminal;
  - a module for selecting an association between said physical interface and at least one software interface of at least one terminal, from amongst all the possible associations;
  - a module for managing the interfaces designed to provide the routing of the messages between the physical interface and the associated software interface.
- said at least one terminal comprises:
  - a software interface;
  - a module for updating an association between a software interface and an external physical interface;
  - a module for enabling the software interface;
  - a module for managing at least one software interface designed to exchange messages between the enabled software interface with an external physical interface.

According to another hardware aspect, the invention also relates to a communications system such as defined hereinabove, characterized in that the physical interface is located on the emulation device and the virtual interface is located on a first terminal.

According to another hardware aspect, the invention also relates to a communications system such as defined hereinabove, characterized in that the physical interface is external to the emulation device and is located on a first terminal and the virtual interface is located on at least a second terminal.

According to another hardware aspect, the invention also relates to a computer program comprising code instructions for the implementation of a method for emulating a physical interface such as described hereinabove, when the latter is executed by a processor.

According to another hardware aspect, the invention also relates to a computer program comprising code instructions for the implementation of a method for managing a software interface such as described hereinabove, when the latter is executed by a processor.

According to yet another hardware aspect, the invention relates to a recording medium readable by a data processor on which a program is recorded comprising program code instructions for the execution of the steps of the emulation method defined hereinabove.

According to yet another hardware aspect, the invention relates to a recording medium readable by a data processor on which a program is recorded comprising program code instructions for the execution of the steps of the method for managing a software interface defined hereinabove.

This emulation device, this terminal, this system and these computer programs exhibit features and advantages analogous to those previously described in relation with the emulation method and the method for managing a software interface.

The invention will be better understood upon reading the description that follows, presented by way of example and with reference to the appended drawings.

DETAILED DESCRIPTION OF ONE EXEMPLARY EMBODIMENT ILLUSTRATING THE INVENTION

Figure 1:
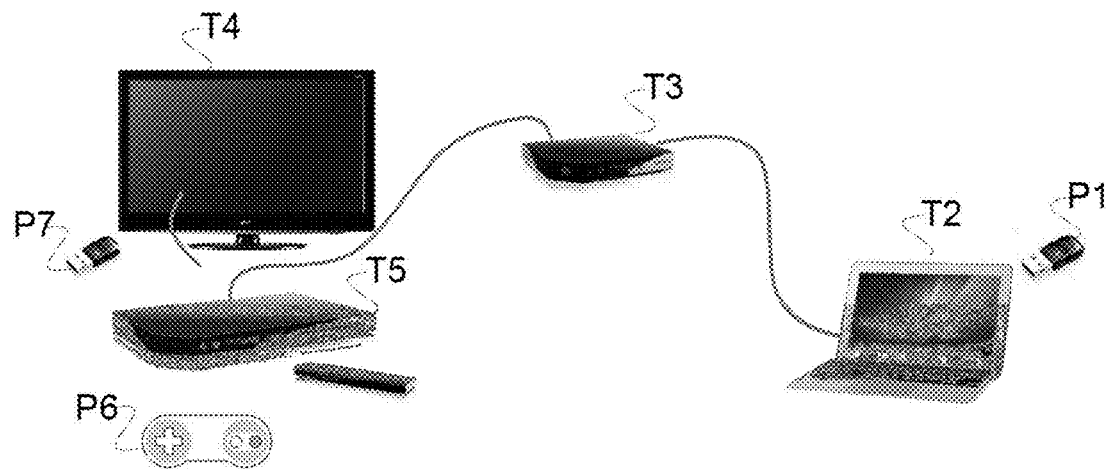
FIG. 1 shows a local network according to the prior art.

FIG. 1 shows a local network according to the prior art.

The context of the home (domestic) local network is presented by way of example and could be readily transposed into that of a corporate network or of any type of Internet network.

Conventionally, the local network comprises a service gateway (T3, BOX), in this example a domestic gateway, which notably provides the routing of the data within the local network, and also between the broadband network (not shown) and the local network.

The local network comprises three other terminals: a personal computer (T2, PC), a television set (T4, TV) and a digital television set decoder (T5, STB).

In the following, 'terminal equipment', or more simply 'terminal', is understood to mean any device capable of connecting to the home network (printer, digitizing device, digital tablet, smartphone, hard disk, etc.). Conventionally, according to the present example, the television set is located in the living room, the domestic gateway in the office and the portable computer in the bedroom of the user.

In such a context, the user wishing to get a file onto his/her USB stick has to go up to the bedroom in order to connect the memory stick to the USB port of his/her PC; the user cannot connect his/her digital camera to the television set which does not have the appropriate connection hardware (no SD card reader); the user is obliged to connect his/her joystick to the STB which may be difficult to access; the user cannot share his/her USB stick between two terminals (tablet and PC, for example).

Figure 2:
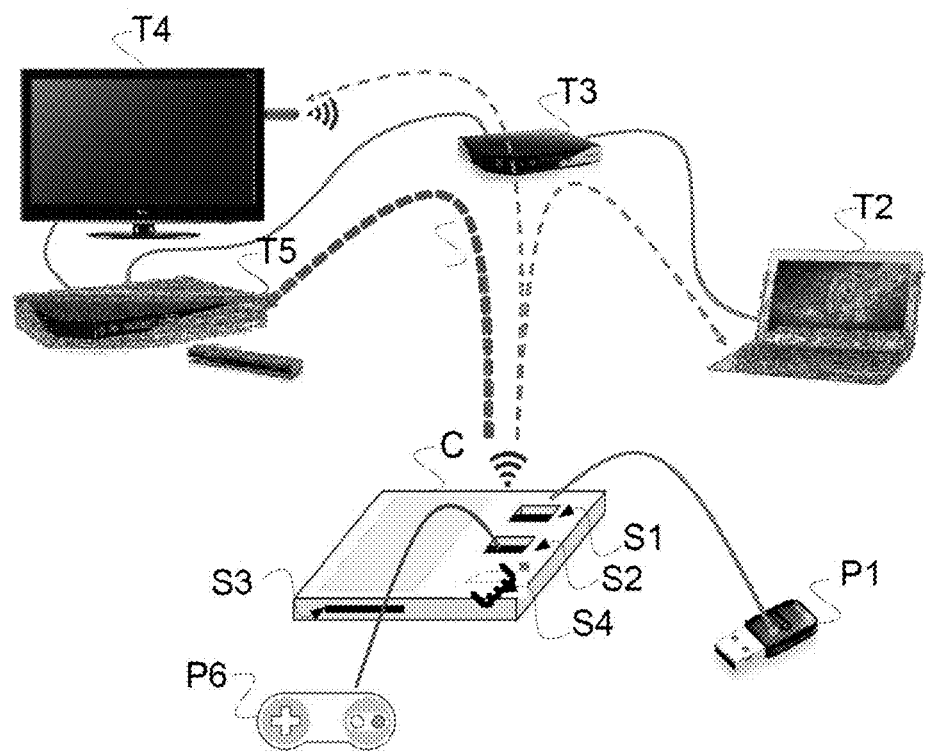
FIG. 2 shows the general application of one embodiment of the invention in a local network.

FIG. 2 shows the general application of one embodiment of the invention within a local network, which solves all the problems raised hereinabove.

The general context of FIG. 2 is identical to that in FIG. 1 but, according to the invention, the user has obtained an emulation device (C) which he/she has put in a place which is easily accessible to him/her, for example on the living room table.

The idea of the invention is to simulate over the network (in the present case, a local network of the IP type but alternatively the network may be of a different type) the physical layer of various peripheral devices. This simulation, or emulation, or again "virtualization", allows access to be gained to peripheral devices external to the terminal, these peripheral devices being seen as peripheral devices local to the terminal.

The idea of the invention is in other words to perform a routing of the data from a server device (here, the emulation device) having physical interfaces to one or more terminal devices within the network (home or broadband), thus transferring the physical interfaces.

The emulation device (C) in FIG. 2 comprises a set of physical ports corresponding for example to the standards USB (Universal Serial Bus, a standard for serial communications), SD (Secure Digital), NFC (Near Field Communication), SATA (Serial ATA for the connection of high-rate peripheral storage devices). The device has a screen (not shown) or alternatively a remote screen on the television set.

In the example in FIG. 2, the emulation device comprises two USB ports (S1, S2), an NFC interface (S4) and an SD interface (S3). The emulation device also comprises a set of onboard programs according to the invention, which allow the successive recognition of the terminals, the association of the terminals and of the peripheral devices, then the transfer of the data between the terminals and associated peripheral devices.

According to this example, the user connects the USB stick and the joystick to two USB ports of the emulation device then associates the USB stick with two terminals (PC, TV) of the local network and the joystick with the STB (T5).

The TV (T4) is furthermore equipped with a Wifi/USB adaptor device ('dongle') in order to be able to exchange data with the emulation device.

Generally speaking, this invention is applicable to any given terminal connected to the local network, to the broadband network, or via a WiFi/USB or Ethernet/USB adaptor (dongle). The terminals may be innately compatible or rendered compatible by the installation of a specific driver.

This association may be carried out automatically, or via a user interface provided on the device.

Subsequently, everything happens as if the USB stick were connected to the PC (T2) and to the TV (T4), and as if the joystick were connected directly to the STB (T5).

Figure 3:
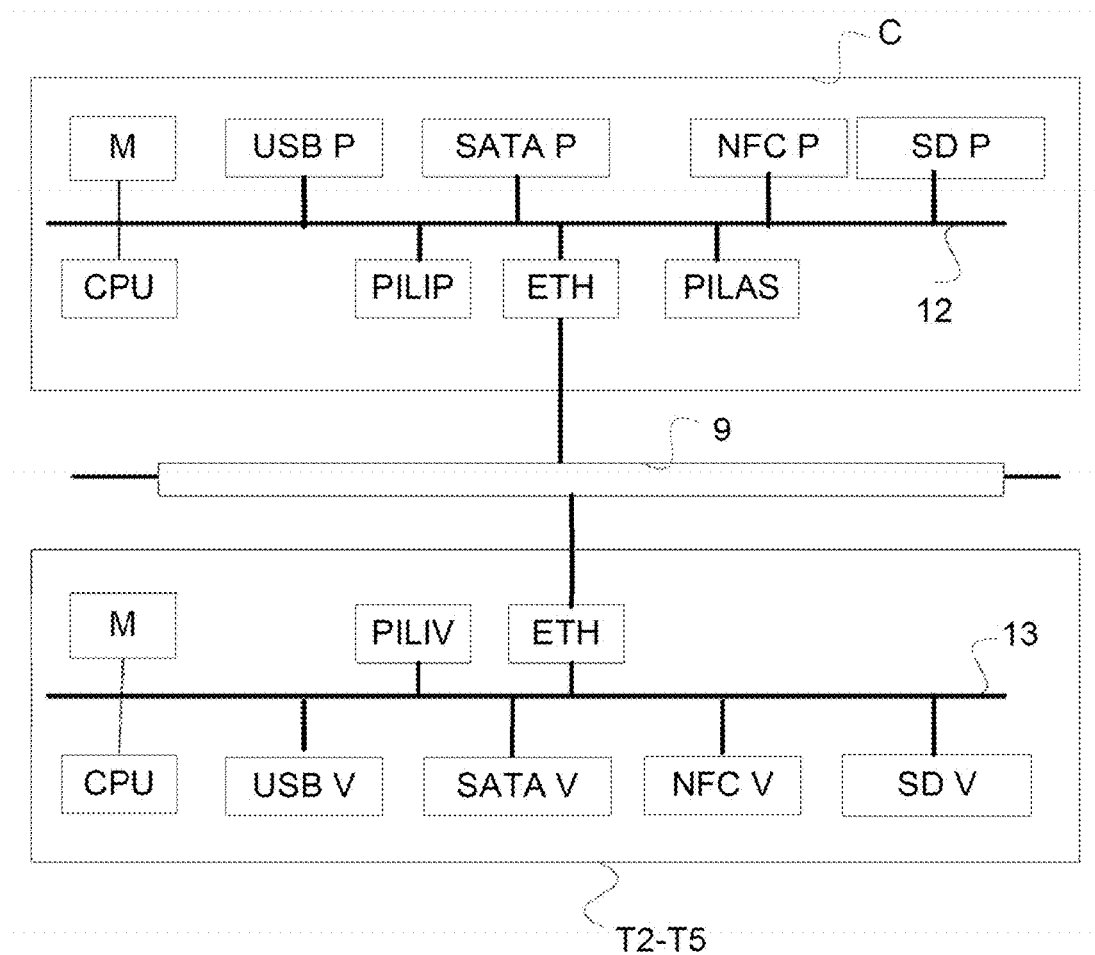
FIG. 3 shows a hardware architecture of a device according to the invention connected to a terminal of the local network.

FIG. 3 shows a hardware architecture of a device according to the invention (C) connected to a terminal (T2-T5) of the local network.

The emulation device (C) conventionally comprises memories (M) associated with a processor (CPU). The memories may be of the ROM (Read Only Memory) or RAM (Random Access Memory) type or alternatively a Flash memory. The emulation device (C) communicates over the local network (9) via the module ETH (Ethernet).

According to FIG. 2, the device comprises a set of physical interfaces (S1-S4) corresponding to the standards USB (S1, S2), SD (S4), NFC (NFC P, S4). Each of these interfaces is managed by a driver for the physical interface (USB P, SD P, NFC P). The device furthermore comprises a physical interface SATA, not shown, managed by a driver "SATA P".

In the context of this application, "physical interface" refers not only to the hardware, but also the whole set of drivers that allow access to them.

All the modules conventionally communicate with one another via a databus (12).

The emulation device (C) also comprises a module PILAS for "PILoting the ASsociations", capable of providing the virtual association of a physical interface on the emulation device (C) with one or more software interfaces, or virtual interfaces (VS1-VS4), on a terminal of the network. The module PILAS notably accesses the memory of the emulation device (M) for creating, consulting and updating the table of the associations (TIV) within it which interconnect the physical interfaces of the emulation device and the virtual interfaces of the terminals. This table will be described hereinbelow with reference to FIGS. 4 and 5. The module PILAS may for example be a software program being executed within the memory of the emulation device, or a hardware and software assembly. The module PILAS may, alternatively, be located on another unit of equipment of the local network, or on an external server.

The emulation device (C) furthermore comprises a module PILIP ("PILoting of the Physical Interfaces") for controlling the communication between the physical interfaces of the emulation device and the various virtual interfaces on the remote terminals. It is notably responsible for reading the associations in the table of the associations and for controlling accordingly the communication between a physical interface and a virtual interface (routing of the messages, priorities, etc.)

The terminal (T2-T5) also comprises memories (M) associated with a processor (CPU). It communicates over the local network (9) via the module ETH (Ethernet). All its modules communicate with one another via a databus (13). The terminal shown in this example comprises a set of virtual interfaces (VS1-VS4) corresponding to the standards USB, SD, NFC, SATA. Each of these interfaces is represented by a software module (USB V, SD V, NFC V, SATA V). A software interface, which is also equally referred to as a "virtual interface" in the following part of the application, is a software module being executed on the terminal and having the same access (to the terminal) as the driver of an equivalent physical interface. In other words, this software module manages all the communications (in read and/or write mode) with the terminal as if it were a driver of an equivalent physical interface.

The device also comprises a management module PILIV ("PILoting of the Virtual Interfaces") for the various virtual interfaces, capable of creating the association of a virtual interface (software) with a physical interface on the emulation device (C). The module PILIV also accesses the memory of the terminal so as to create, consult, update the tables of association within it which allow the module to be aware, at a given moment in time, of the virtual interfaces that are available to it. The module PILIV may for example be a software program being executed within the memory of the terminal.

Figure 4:
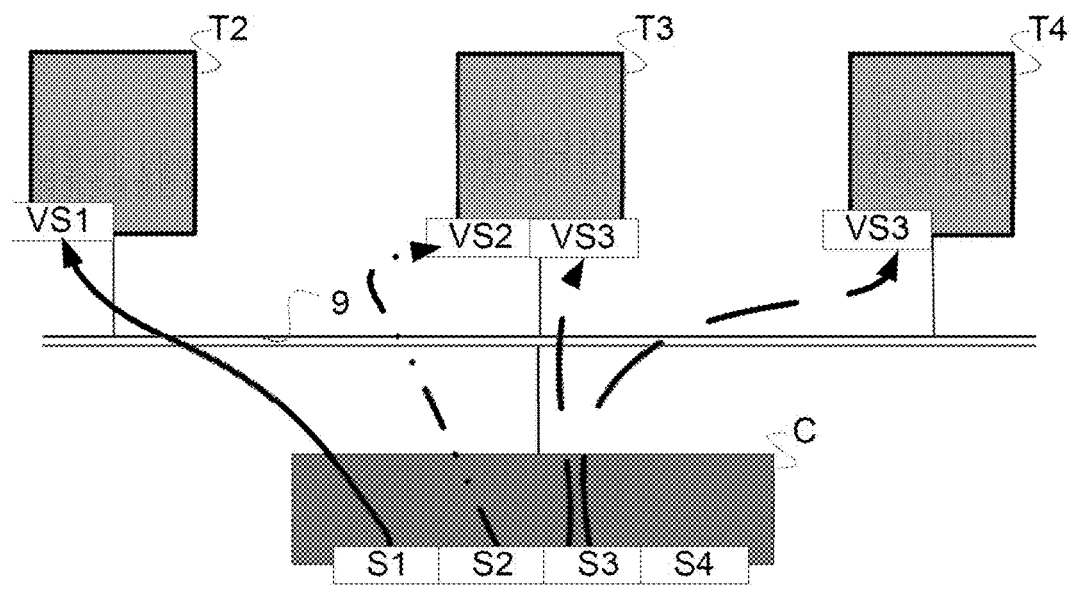
FIG. 4 shows one embodiment of the invention.

FIG. 4 shows one embodiment of the invention.

In this example, the three terminals T2 (PC), T3 (domestic gateway) and T4 (TV), together with the emulation device (C) according to the invention, are connected to the local network (9) controlled by the gateway. According to FIG. 2, the emulation device (C) comprises four physical interfaces (S1-S4). It comprises a table in memory, represented schematically in the lower part of the figure. This table (TIV—"Table of the Virtual Identifications"), which allows the device to manage the associations between its physical interfaces and virtual interfaces on the various terminals, comprises for each physical interface:

one column SRC for indicating the source terminal which physically carries the interface (here, they are all located on the emulation device C);

one column I/F(T) for indicating the reference of the physical interface, together with its type (T), for example S1 (USB) for the physical interface 1 of the USB type;

one column (Ti) per terminal (for example the column T2 for the terminal 2) comprising the list of virtual interfaces (VS1-VS4) of the terminal, in association with a physical interface (S1-S4).

Thus, according to this example, the terminals T3 and T4 both have a virtual interface VS3 corresponding to the physical interface number 3 (S3) on the emulation device. In other words, a physical SD card inserted into the SD slot of the emulation device becomes accessible from the domestic gateway (T3) and the TV (T4).

In order to arrive at this association, the emulation device has previously run a sequence of several steps which will be described hereinbelow with reference to FIG. 6:

Discovery of the terminals available in the network;

Discovery of the services and physical interfaces offered by each terminal;

Pre-association of drivers with the various terminals (corresponding, in the present example, to an initialization in memory of the table TIV), which may result in a table of the following form:

TABLE 1 table of the pre-associations (TAS)

| SRC/IF (T) | T2 (PC) | T3 (BOX) | T4 (TV) |
|---|---|---|---|
| C/S1 (USB) | Yes | Yes | Yes |
| C/S2 (USB) | Yes | Yes | No |
| C/S3 (SD) | Yes | Yes | Yes |
| C/S4 (NFC) | No | Yes | No |

Whenever a cell of the table comprises a "yes", the pre-association phase can allow the corresponding driver to be installed on the terminal: for example, the terminal T4 being declared compatible with the interfaces S1 and S3, the drivers corresponding to these two types of interfaces (SD and USB) may be installed on the TV with a view to a later association.

Management of the drivers, of the versions of the terminals and updating where necessary.

Management of the table of associations (TIV), for example upon intervention by the user: if the user requests a virtual SD interface on his/her television set (T4), the terminal T4, having been declared compatible, will be able to be associated with the interface S3 of the emulation device.

Automatic management of the table of quality of service, namely optimization of the services as a function of the available bandwidth and prioritization of the streams according to their type.

In order to arrive at this association, in the present example, a terminal has, for its part, previously run a sequence of several steps which will be described hereinbelow with reference to FIG. 6:

Advertisement of the terminal on the network:

Advertisement of the services, physical interfaces, drivers, etc. offered by the terminal.

Declaration of the physical peripheral devices offered by the terminal (hard disk, printer, etc.)

Management of the drivers on the terminal (installations, updates, etc.)

Figure 5:
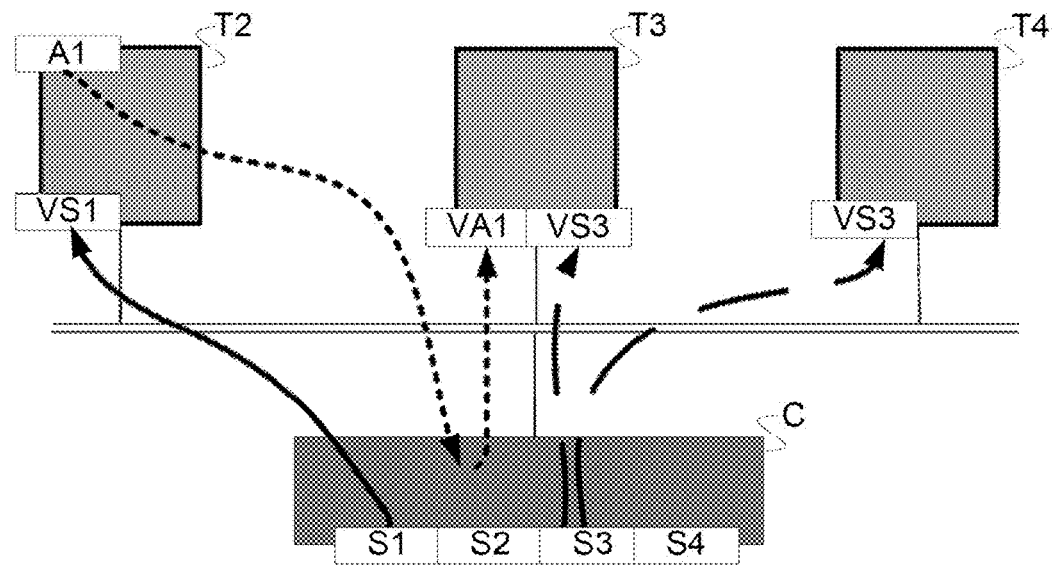
FIG. 5 shows another embodiment of the invention.

FIG. 5 shows another embodiment of the invention.

This example is very similar to that illustrated by FIG. 4, except that the emulation device (C) according to the invention uses not only its own physical ports but also the physical ports of the terminals: it may be responsible for the physical USB port of the terminal 2 (T2, PC) and subsequently associate it with another terminal, therefore ensuring the routing of the data from the physical port of the terminal 2 to the virtual port of the terminal 3.

The table TIV comprises an additional row for indicating the association of the physical interface A1 with the virtual interface VA1 on the terminal T3.

Figure 6:
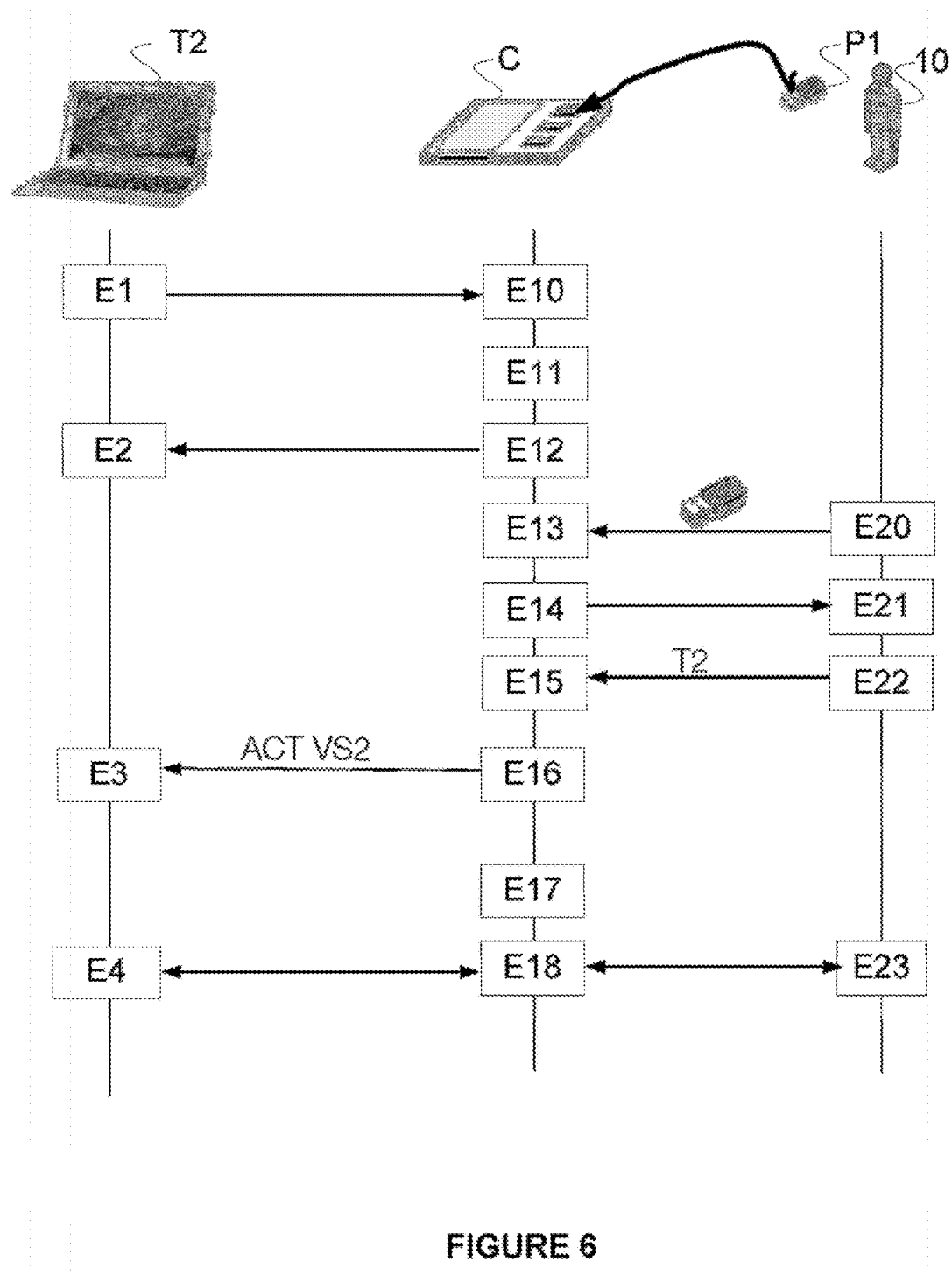
FIG. 6 shows a timing diagram of the exchanges between a device and a terminal according to one embodiment of the invention.

FIG. 6 shows a timing diagram of the exchanges between an emulation device and a terminal according to one embodiment of the invention.

During a step E1, a terminal logs itself on to the emulation device (C) of the invention, for example the PC 2 in FIG. 1. The terminal may present itself automatically to the emulation device in order to be logged on and to dynamically declare its own capacities (drivers available, physical interfaces and peripheral devices connected, etc.). Alternatively, the rules of logging on can be implicit. For example, if there is only one terminal in the local network, or one terminal of a single type (PC, etc.), the emulation device may initiate itself this discovery phase, in order to acquire the characteristics of the terminal or terminals, and to directly associate certain peripheral devices with certain terminals. For example, a USB stick may be automatically associated with the PC of the local network, if the latter is the only PC, or with several PCs of the local network; the joystick may be systematically associated with the STB, etc.

The emulation device receives the request to log on during a step E10.

During a step E11, the emulation device constructs a first table of the possible associations (TAS) between the terminal and the physical ports which could potentially be associated with it. Such a table may be constructed according to the present example in the following manner:

the emulation device has three interfaces (S1, S2, S3);

it can associate with the terminal 2, which has just declared itself, the interface S1 (USB), the interface S2 (USB), the interface S3 (SD) even though the terminal does not innately have one, but not the interface S4 (NFC).

Thus, the following table is established, with respect to the terminal 2 (T2):

TABLE 2 table of the pre-associations for the terminal 2

| SRC/IF (T) | I/F (T) | T2 |
|---|---|---|
| C/S1 (USB) | S1 (USB) | YES |
| C/S2 (USB) | S2 (USB) | YES |
| C/S3 (SD) | S3 (SD) | YES |
| C/S4 (NFC) | S4 (NFC) | NO |

The operation is repeated for each terminal that declares itself or is discovered by the emulation device, thus arriving at a table with several columns as presented beforehand.

Then, it could send back to the terminal, during a step E12, the result of the interfaces selected for a potential association.

Upon receiving this message, the terminal updates (step E2) its list of drivers supported and of physical interfaces, in order to notably enhance the hardware compatibility of the system. For example, the terminal may receive the following pieces of information:

one of its USB ports has been "virtualized" on the emulation device, in other words any subsequent connection of a USB stick to the associated physical port of the emulation device will have the same result as a direct connection to the USB port of the terminal (refer to FIG. 4).

a new SD port has been "virtualized" on the emulation device, in other words, although the terminal does not innately have an SD port, everything will henceforth happen as if the associated SD port of the emulation device were physically located on the PC.

A new NFC port has been "virtualized" on the smartphone of the user of the PC, in other words any subsequent NFC communication addressed to the smartphone will end up at the PC of the user.

etc.

During a later step E20, the user connects a USB stick to one of the physical ports (S1, S2) of the emulation device.

During the step E13, the emulation device according to the invention detects the connection of the USB stick to one of its interfaces (for example S2) and consults its table of pre-associations of the interfaces (TAS). Following this operation, it may present the user (E14) with a graphics interface displaying all of the terminals that have a virtual USB port, in the present example the terminals 2 (PC), 3 (domestic gateway) and 4 (TV). This step is optional since the association, as previously mentioned, may be automatic.

It should be noted that the emulation device can allow several client terminals to simultaneously access a physical peripheral device and that, in this case, it manages the arbitration.

During a step E21, the client displays the information on possible associations in the form of a graphics interface presenting the user with a list of possible associations. The latter can choose by a single click the association of a physical device with a given terminal.

During a step E22, the user chooses, for example via the graphics interface, to connect the USB stick to his/her PC (T2).

This information is received in the step E15 by the device which validates this association and updates the table of the associations (TIV) in order to take this new association into account.

During a step E16, which may succeed the above step, the emulation device prepares an acknowledgement for the terminal in question which receives, during a step E3, this information indicating to it that its virtual interface VS2 is henceforth active and ready to operate.

During a step E17, which may succeed the above step, the emulation device prepares a table of quality of service, which allows it to arbitrate the potential conflicts between the various terminals, notably the priority that may be assigned to some of them (for example, in the case where a USB interface is shared) and the distribution of the bandwidth.

The emulation device is indeed capable of diagnosing the route leading from a physical peripheral device to a host in order to be aware of the maximum bandwidth available over this link; the server maintains a table of prioritization of the streams and is thus capable of providing a quality of service (QoS) to its clients.

During a step E18, the emulation device receives a read and/or write request originating from the terminal (2) that has requested this operation during the step E4. During the step E18, a consultation of its table of associations (TIV) allows the emulation device to re-route the read (respectively write) command toward the interface associated with the terminal 2, here the USB port 2.

Finally, the step E23 corresponds to the physical writing or to the reading in the USB device, under the control of the emulation device (C).

It goes without saying that the embodiment which has been described hereinabove has been presented solely by way of example and is in no way limiting, and that numerous modifications may easily be applied by those skilled in the art without however straying from the scope of the invention.

For example, a remote service in the broadband network may thus be identified to the domestic gateway, or to one of the terminals of the network, everything happening in this case, by virtue of the invention, as if the service were located within the local network: for example, the data of a user can be saved onto a hard disk which is located within the broadband network whereas it appears to be physically connected to the PC of the user, etc.

An exemplary embodiment of the present invention provides a solution that does not have the drawbacks of the prior art.

Although the present disclosure has been described with reference to one or more examples, workers skilled in the art will recognize that changes may be made in form and detail without departing from the scope of the disclosure and/or the appended claims.

The invention claimed is:

1. An emulation method comprising the following acts performed by an emulation device capable of communicating within a network:
    emulating a physical interface of the emulation device so as to establish a bidirectional communication between the physical interface of the emulation device and at least a terminal of the network that is distinct from the emulation device, said physical interface being designed to receive at least one unit of peripheral equipment, the emulating comprising:
        pre-associating, establishing a set of possible associations between said physical interface of the emulation device and at least one software interface of the at least one terminal;
        selecting an association between said physical interface and at least one software interface of the at least one terminal, from amongst all the possible associations; and
        routing of messages between the physical interface of the emulation device and the associated software interface of the at least one terminal.

2. The emulation method as claimed in claim 1, wherein the pre-associating act is preceded by an act of declaring at least one terminal of the network to the device.

3. The emulation method as claimed in claim 1, wherein the pre-associating act is followed by managing priorities.

4. The emulation method as claimed in claim 1, wherein the selecting act automatically selects an association if this association is the only one possible following the pre-associating act.

5. A method comprising the following acts performed by a terminal capable of communicating within a network:
    managing a software interface on the terminal, said managing comprising:
        receiving or obtaining a pre-association information establishing a set of at least one possible association between said software interface and an external physical interface of an emulation device, distinct from the terminal and connected to the network;
    updating an association between the software interface and the external physical interface of the emulation device;
    enabling the software interface so as to establish a bidirectional communication between the physical interface of the emulation device and the terminal; and
    exchanging a message between the terminal and the associated external physical interface, via the enabled software interface.

6. An emulation device comprising:
    a processor; and
    a non-transitory computer-readable medium comprising instructions stored thereon, which when executed by the processor configure the emulation device to perform acts comprising:
    communicating within a network; and
    emulating a physical interface of the emulation device so as to establish a bidirectional communication between the physical interface on the emulation device and at least a terminal of the network that is distinct from the emulation device, said physical interface being designed to receive at least one unit of peripheral equipment, the emulating comprising:
    pre-associating, establishing a set of possible associations between said physical interface of the emulation device and at least one software interface of the at least one terminal;
    selecting an association between said physical interface and at least one software interface of the at least one terminal, from amongst all the possible associations; and
    routing of messages between the physical interface of the emulation device and the associated software interface of the at least one terminal.

7. The emulation device as claimed in claim 6, wherein the physical interface is located on the device.

8. The emulation device as claimed in claim 6, wherein the physical interface is external to the device.

9. A terminal comprising:

a processor; and a non-transitory computer-readable medium comprising instructions stored thereon, which when executed by the processor configure the terminal to perform acts comprising:

communicating within a network; and managing a software interface on the terminal, said managing comprising:

- receiving or obtaining a pre-association information establishing a set of at least one possible association between said software interface and an external physical interface of an emulation device, distinct from the terminal and connected to the network;
- updating an association between the software interface and the external physical interface of the emulation device;
- enabling the software interface so as to establish a bidirectional communication between the physical interface of the emulation device and the terminal; and exchanging a message between the terminal and the associated external physical interface, via the enabled software interface.

10. A communications system comprising:

at least one terminal;

an emulation device, which is distinct from the terminal, comprising:

a first processor; and a first non-transitory computer-readable medium comprising instructions stored thereon, which when executed by the first processor configure the emulation device to perform acts comprising:

communicating within a network; and emulating a physical interface of the emulation device so as to establish a bidirectional communication between the physical interface of the emulation device and the at least a terminal, said physical interface being designed to receive at least one unit of peripheral equipment, the emulating comprising:

- pre-associating, establishing a set of possible associations between said physical interface of the emulation device and at least one software interface of the at least one terminal;
- selecting an association between said physical interface and at least one software interface of the at least one terminal, from amongst all the possible associations; and
- routing of messages between the physical interface of the emulation device and the associated software interface of the at least one terminal; and said at least one terminal comprising:

a second processor; and a second non-transitory computer-readable medium comprising instructions stored thereon, which when executed by the second processor configure the at least one terminal to perform acts comprising:

communicating within the network; and managing the at least one software interface on the at least one terminal, said managing comprising, for at least one of the at least one software interface:

updating an association between the software interface and the external physical interface of the emulation device;

enabling the software interface so as to establish the bidirectional communication between the physical interface of the emulation device and the at least one terminal; and exchanging a message between the at least one terminal and the associated external physical interface, via the enabled software interface.

11. The communications system as claimed in claim 10, wherein the physical interface is located on the emulation device and the software interface is located on a first terminal.

12. The communications system as claimed in claim 10, wherein the physical interface is external to the emulation device and is located on a first terminal and the software interface is located on at least a second terminal.

* * * * *